No. 11,979. Reissued Apr. 1, 1902.

J. J. LONERGAN & A. C. CALKINS.

ASSAYER'S FURNACE.

(Application filed Feb. 14, 1899.)

Witnesses
Terry Kingman.
J Townsend

Inventors
John J Lonergan
Albert C. Calkins
by Townsend Bros
Their Attys

THE NORRIS PETERS CO., PHOTO-LITHO., WASHINGTON, D. C.

UNITED STATES PATENT OFFICE.

JOHN J. LONERGAN AND ALBERT C. CALKINS, OF LOS ANGELES, CALIFORNIA, ASSIGNORS, BY MESNE ASSIGNMENTS, TO F. W. BRAUN & COMPANY, OF LOS ANGELES, CALIFORNIA.

ASSAYER'S FURNACE.

SPECIFICATION forming part of Reissued Letters Patent No. 11,979, dated April 1, 1902.

Original No. 603,833, dated August 9, 1898. Application for reissue filed February 14, 1899. Serial No. 705,515.

*To all whom it may concern:*

Be it known that we, JOHN J. LONERGAN and ALBERT C. CALKINS, of Los Angeles, in the county of Los Angeles and State of California, have invented a new and useful Improvement in Assayers' Furnaces, of which the following is a specification.

As is well known to those skilled in the use of muffle and allied furnaces, more especially those in which a highly-volatile hydrocarbon, such as gasolene, is employed as fuel, the oxidation of the charges is defective, so that cupellation is practically impossible in a large portion of the muffle and is effected slowly and imperfectly even in the remaining portion. To remove this objection, we provide an attachment for the class of furnaces referred to whereby oxidation is promoted to such a degree that cupellation is effected rapidly and completely in all parts of the muffle.

In practice we have found that very desirable results are secured by locating the attachment upon the exterior of the furnace in position to communicate with the furnace at one end and preferably with the furnace-flue at the other and to provide it with means, as a damper, for regulating the passage of the oxidized material from the muffle.

Our invention is embodied in the construction and combination of parts, as hereinafter described.

Figure 1:
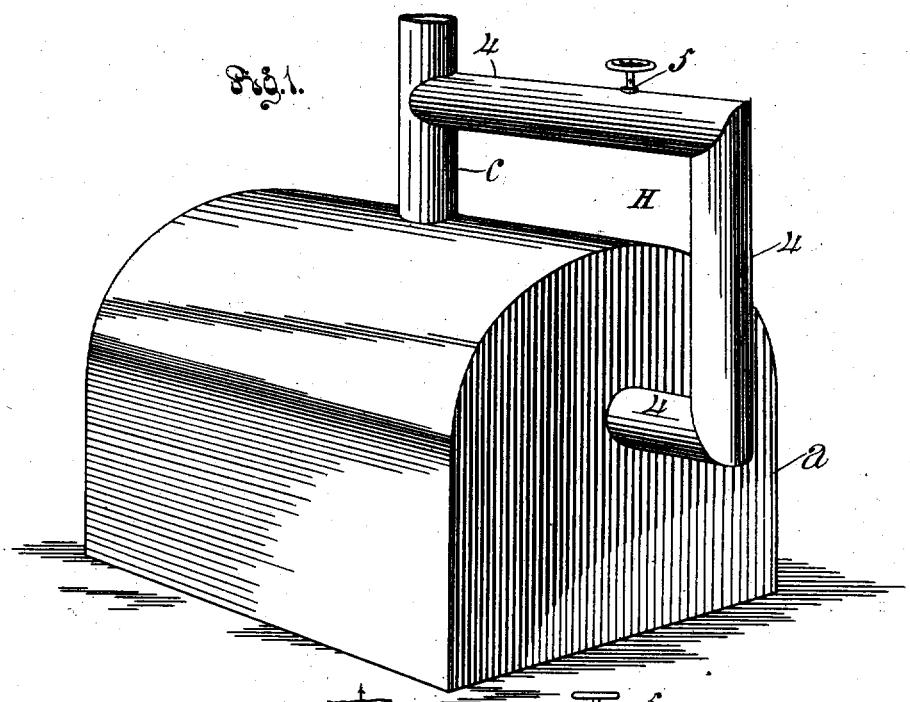
Figure 2:
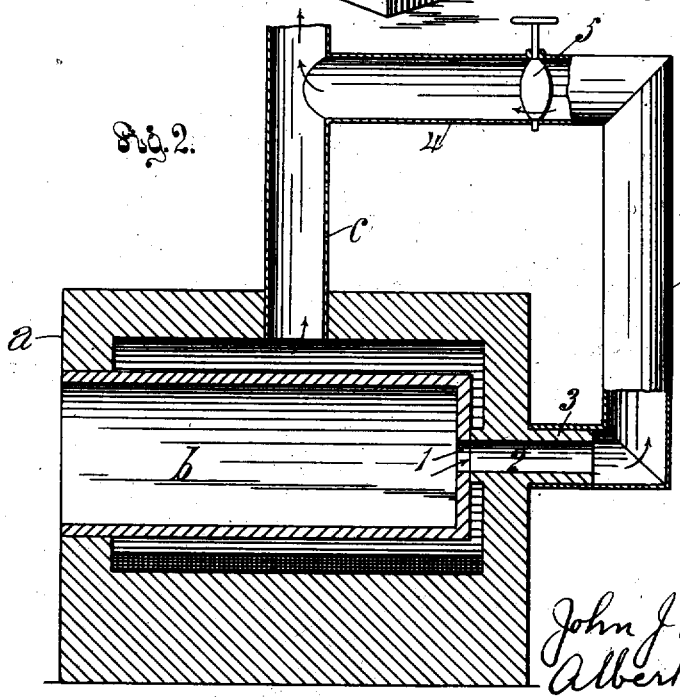

In the accompanying drawings, Figure 1 is a perspective view of a muffle-furnace provided with our improvement. Fig. 2 is a longitudinal vertical section of the same.

The body of the furnace *a* and the muffle *b* therein are shown arranged and the former provided with a flue *c* in a well-known manner. Instead of the muffle *b* being closed at its inner or rear end it is provided with an opening 1, that communicates with a horizontal passage 2 in the adjacent end wall of the furnace *a*, and said wall is also constructed with a boss or tubular extension 3, as shown. Our tubular oxidizing attachment H is shown connecting such boss 3 with the furnace-flue *c*—that is to say, the same consists of an angular sheet-metal pipe or tube 4, one end of which engages the furnace boss or extension 3 and the other or upper end is permanently attached to the main flue *c*. Such pipe or tube 4 is also provided with a damper 5, which may be adjusted as required to modify the oxidizing action in the muffle without materially changing the draft through the fire-box of the furnace.

The heat in the main flue *c* creates by induction a draft of air in the attachment 4 and through the muffle *b*. As the air from the muffle enters the attachment it is cooled to a greater or less extent, owing to its removal from the furnace or source of heat and also on account of the thin walls of the attachment. This cooling necessarily causes a contraction of the gases, which has a tendency to create a vacuum, which must be filled through one end or the other of the attachment, and as the draft in the furnace-flue is strong enough to overcome any tendency for the smoke therein to be drawn back into the attachment the draft through the muffle must be increased to supply the material to occupy the space vacated by the contracting gases within the attachment. As the cooled gases are being constantly withdrawn from the attachment by the draft through the furnace-flue, space is provided for the incoming heated gases, which are in turn cooled in the attachment and withdrawn through the furnace-flue. The increased quantity of air thus drawn through the muffle furnishes a plentiful supply of oxygen, so that the cupel charges are rapidly and completely oxidized in all parts of the muffle *b*. The draft through the muffle can be controlled to suit all conditions and kinds of material, being operated upon by means of the damper, which is preferably located adjacent to the exit into the furnace-flue, thereby placing the operation completely under the control of the attendant. In this operation the unconsumed gases and fumes pass through the attachment into the main flue. Thus by this simple and inexpensive attachment the work of the furnace is greatly promoted and rendered practically uniform and complete.

The oxidizing-flue 4 is of comparatively large capacity, so as to insure as positive oxidizing action as may be required, the same being readily modified or entirely shut off, as required for different stages of the work.

What we claim is—

1. An assayer's furnace consisting of a furnace-body, a muffle therein provided with a draft-opening, and draft-inducing means exteriorly of the furnace-body in communication with the draft-opening of the muffle.

2. An assayer's furnace consisting of a furnace-body provided with an opening and a draft-flue, a muffle within said body provided with a draft-opening, and draft-inducing means exteriorly of the furnace-body, communicating respectively with the draft-opening of the muffle through the furnace-wall, and with the draft-flue.

3. An assayer's furnace consisting of a furnace-body provided with an opening and a draft-flue, a muffle in the body provided with a draft-opening in communication with the opening in the furnace, a conduit exteriorly of the furnace-body communicating respectively with the draft-opening of the muffle through the furnace-wall, and with the draft-flue, and means within said conduit for regulating the draft through the muffle.

4. An assayer's furnace consisting of a furnace-body provided with an opening and with a draft-flue, a muffle in the body provided with a draft-opening in communication with the opening in the furnace-wall, and a thin-walled draft-inducing means exteriorly of the furnace in communication respectively with the muffle through the furnace-wall and with the furnace-flue.

5. An assayer's furnace consisting of a furnace-body provided with an opening and a draft-flue, a muffle in the body provided with a draft-opening in communication with the opening in the furnace-wall, a sheet-metal pipe communicating with the opening in the furnace-wall and with the flue, and a damper in said pipe for regulating the draft through the muffle.

6. The improved assaying-furnace, adapted for burning gasolene or other hydrocarbon, the same comprising the body or casing *a*, having the rear horizontal passage 2, the muffle having a rear opening registering with such passage, the rear tubular extension or boss 3, the main flue attached to top of the furnace, and the oxidizing attachment, consisting of the exterior pipe 4, connecting the aforesaid boss and main flue, and provided with a damper, as shown and described.

7. The improved assaying-furnace, comprising the body *a* having the rear passage 2, the muffle arranged with its inner end provided with an opening and separated from the rear wall of said body, save where the passage and opening coincide, the main flue, and the oxidizing attachment consisting of an exterior pipe which connects the aforesaid passage and main flue, as shown and described.

In testimony that we claim the foregoing as our invention we have signed our names, in presence of the subscribing witnesses, this 4th day of February, 1899.

JOHN J. LONERGAN.
ALBERT C. CALKINS.

Witnesses:
F. M. TOWNSEND,
JAMES R. TOWNSEND,
L. C. BECKER.